(12) United States Patent
Peral et al.

(10) Patent No.: US 10,698,095 B1
(45) Date of Patent: Jun. 30, 2020

(54) SYSTEMS AND METHODS AND PERFORMING OFFSET IQ MODULATION

(71) Applicant: California Institute of Technology, Pasadena, CA (US)

(72) Inventors: Eva Peral, Altadena, CA (US); Simone Tanelli, Pasadena, CA (US); Chaitali R. Parashare, Pasadena, CA (US); Douglas L. Price, Pasadena, CA (US); Ninoslav Majurec, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 446 days.

(21) Appl. No.: 14/857,810

(22) Filed: Sep. 17, 2015

Related U.S. Application Data

(60) Provisional application No. 62/065,179, filed on Oct. 17, 2014.

(51) Int. Cl.
  *G01S 13/02* (2006.01)
  *G01S 7/288* (2006.01)

(52) U.S. Cl.
  CPC ... *G01S 13/0209* (2013.01); *G01S 2007/2886* (2013.01)

(58) Field of Classification Search
  CPC ....... G01S 2007/2886; G01S 2007/358; G01S 7/292; G01S 7/2928; G01S 7/484;
  (Continued)

(56) References Cited

U.S. PATENT DOCUMENTS 4,890,301 A * 12/1989 Hedberg ............... H03C 1/00
  375/296
4,893,316 A * 1/1990 Janc ..................... H03C 3/40
  341/110
(Continued)

FOREIGN PATENT DOCUMENTS

WO   WO-2009156510 A2 * 12/2009 ............ H04B 1/109
WO   WO-2014036984 A1 * 3/2014 ........... G01S 7/4021

OTHER PUBLICATIONS

"Aerosols-clouds-ecosystems (ACE)", Nov. 16, 2010, 24 pgs.
(Continued)

*Primary Examiner* — Bernarr E Gregory
*Assistant Examiner* — Nuzhat Pervin
(74) *Attorney, Agent, or Firm* — KPPB LLP

(57) ABSTRACT

Systems and methods in accordance with embodiments of the invention transmit and detect electromagnetic signals using an offset IQ modulation technique. Offset IQ modulation systems use a digital to analog converter to generate a transmitted waveform that is frequency offset from direct current by an amount equal or larger than half the signal bandwidth, so that the level of any local oscillator leakage present within the frequency band containing the transmitted signal is insignificant. When the transmitted signal is received, an IQ mixer is also used to down convert the received signal. In many embodiments, the down converted signal is over sampled and provided to a digital signal processing system to perform linear filtering to remove intermodulation and/or crossmodulation components that can be introduced by nonlinearities in components such as (but not limited to) Power Amplifiers, Low Noise Amplifiers and/or the IQ mixer used during the down conversion.

18 Claims, 7 Drawing Sheets

(58) Field of Classification Search
CPC ...... G01S 7/486; G01S 7/4876; G01S 7/4911;
G01S 7/4912; G01S 7/493; G01S
7/52023; G01S 7/52028; G01S 7/52031;
G01S 7/523; G01S 7/524; G01S 7/526;
G01S 7/5273; G01S 7/534; G01S 13/003;
G01S 13/006; G01S 13/0209; G01S
7/282; G01S 13/95; G01S 13/955; G01S
13/953; G01S 13/958; H03C 99/00;
H03C 2200/00; H03C 2200/0037; H03C
2200/0041; H03C 2200/005; H03C
2200/0054; H03C 2200/0058; H03C
2200/0066; H03C 2200/007; H03C
2200/0075; H03C 2200/0079; H03C
2200/0083
USPC .......................................... 342/194
See application file for complete search history.

(56) References Cited

U.S. PATENT DOCUMENTS

| | | | | | |
|---|---|---|---|---|---|
| 5,732,107 | A * | 3/1998 | Phillips | ............... | H03H 17/028 375/229 |
| 5,867,535 | A * | 2/1999 | Phillips | ............... | G01S 1/04 375/295 |
| 7,002,511 | B1 * | 2/2006 | Ammar | ............... | G01S 7/032 342/118 |
| 7,548,726 | B1 * | 6/2009 | Rofougaran | ............... | H03L 7/0995 327/427 |
| 7,558,556 | B1 * | 7/2009 | Moloudi | ............... | H04B 1/40 323/267 |
| 8,055,235 | B1 * | 11/2011 | Gupta | ............... | H04B 1/10 455/296 |
| 8,301,104 | B1 * | 10/2012 | Gupta | ............... | H04B 1/10 455/296 |
| 8,521,117 | B1 * | 8/2013 | Gupta | ............... | H04B 1/10 455/296 |
| 9,793,933 | B1 * | 10/2017 | Gupta | ............... | H04B 1/10 |
| 10,128,878 | B1 * | 11/2018 | Gupta | ............... | H04B 1/10 |
| 2002/0123319 | A1 * | 9/2002 | Peterzell | ............... | H04B 1/109 455/296 |
| 2002/0132597 | A1 * | 9/2002 | Peterzell | ............... | H03D 3/008 455/130 |
| 2003/0021367 | A1 * | 1/2003 | Smith | ............... | H04B 1/123 375/346 |
| 2005/0186930 | A1 * | 8/2005 | Rofougaran | ............... | H03B 27/00 455/260 |
| 2006/0209881 | A1 * | 9/2006 | Howard | ............... | H04L 25/03343 370/465 |
| 2007/0115158 | A1 * | 5/2007 | Zoso | ............... | G06F 1/025 341/143 |
| 2008/0159453 | A1 * | 7/2008 | Smith | ............... | H04B 1/123 375/350 |
| 2009/0137213 | A1 * | 5/2009 | Rofougaran | ............... | H03B 27/00 455/77 |
| 2009/0325509 | A1 * | 12/2009 | Mattisson | ............... | H04B 1/525 455/75 |
| 2010/0159858 | A1 * | 6/2010 | Dent | ............... | H04B 1/123 455/131 |
| 2011/0032046 | A1 * | 2/2011 | Azarian | ............... | H04L 27/0014 332/103 |
| 2012/0236976 | A1 * | 9/2012 | Smith | ............... | H04B 1/123 375/350 |
| 2014/0285276 | A1 * | 9/2014 | Kawasaki | ............... | H03C 3/00 332/103 |
| 2015/0071381 | A1 * | 3/2015 | Nadiri | ............... | H04B 1/0475 375/296 |
| 2015/0204968 | A1 * | 7/2015 | Ding | ............... | G01S 7/038 342/174 |
| 2015/0219751 | A1 * | 8/2015 | Ebling | ............... | G01S 7/038 342/175 |
| 2015/0296527 | A1 * | 10/2015 | Ranson | ............... | H04W 88/085 370/329 |

OTHER PUBLICATIONS

"Decadal Survey Tier 2 Mission Study, Summative Progress Report, ACE Lidar", Nov. 16, 2010, 14 pgs.
Behrenfeld, "Ocean Ecosystems", NASA, Aerosol, Cloud & Ocean Ecosystem Mission, Nov. 16, 2010, 28 pgs.
Diner et al., "Decadal Survey Tier 2 Mission Study summative Progress Report, ACE Polarimeter Development", NASA, Nov. 16, 2010, 10 pgs.
Ellis et al., "ACE Mission Architecture", NASA, Nov. 16, 2010, 31 pgs.
Furukawa et al., "Proto-Flight Test of the Dual-Frequency Precipitation Radar for the Global Precipitation Measurement", 2011 IEEE International Geoscience and Remote Sensing Symposium (IGARSS), Oct. 2011, 4 pgs.
Gettelman, "Key uncertainties in Climate Simulation: Clouds and Aerosols", NCAR, Jul. 2010, 24 pgs.
Gnanadesikan, "Ocean ecosystems from space: Moving beyond chlorophyll", Nov. 16, 2010, 14 pgs.
Kummerow et al., "The Tropical Rainfall Measuring Mission (TRMM) Sensor Package", Journal of Atmospheric and Oceanic Technology, Jun. 1998, vol. 15, pp. 809-817.
Mace et al., "ACE Clouds: Motivation and Mission Concept", Cloud Science Report, Nov. 16, 2010, 22 pgs.
Maring et al., "Decadal Survey Tier 2 Mission Study Summative Progress Report, Aerosol-Cloud-Ecosystem (ACE) Decadal Survey Mission", Agenda, NASA, Nov. 16, 2010, 2 pgs.
Maring et al., "Decadal Survey Tier 2 Mission Study Summative Progress Report, Aerosol-Cloud-Ecosystem (ACE) Decadal Survey Mission", Intro, NASA, Nov. 16, 2010, 6 pgs.
McClain, "ACE Ocean Ecology Sensor (OES) Requirements", ACE Mission Status Review, Nov. 16, 2010, 13 pgs.
Meskhidze, "Ocean-Aerosol Science and STM", Nov. 16, 2010, 24 pgs.
Peral et al., "RainCube: a proposed constellation of precipitation profiling Radars in Cubesat", AGU Fall Meeting, San Francisco, Dec. 15-19, 2014, Presentation Dec. 16, 2014, Retrieved from: https://agu.confex.com/agu/fm14/webprogram/Paper27311.html, 2 pgs.
Peral et al., "RaInCube: a proposed constellation of precipitation profiling Radars in Cubesat", ARSI, Nov. 5, 2014, 4 pgs.
Platnick et al., "ACE Instrument Concepts: Additional Requirements for Clouds", ACE Briefing: Additional Instruments Needs, Nov. 16, 2010, 15 pgs.
Skamarock et al., "A description of the Advanced Research WRF, Version 3", NCAR Tech Note NCAR/RN-4751STR, Jun. 2008, 125 pp.
Starr, "Tier-2 Decadal Survey Mission", Aerosol, Cloud & Ecosystem Mission, 20 pgs.
Stephens et al., "CloudSat mission: Performance and early science after the first year of operation", Journal of Geophysical Research, first published Dec. 10, 2008, vol. 113, D00A18, pp. 1-18.
Tanelli et al., "CloudSat's Cloud Profiling Radar After Two Years in Orbit: Performance, Calibration, and Processing", IEEE Transactions on Geoscience and Remote Sensing, Nov. 2008, vol. 46, No. 11, pp. 3560-3573.
Tanelli et al., "Decadal Survey Tier 2 Mission Study Summative Progress Report", NASA, 2010, 14 pgs.
Tanelli et al., "The Effects on Nonuniform Beam Filling on Vertical Rainfall Velocity Measurements with a Spaceborne Doppler Radar", Journal of Atmospheric and Oceanic Technology, vol. 19, Jul. 2002, pp. 1019-1034.

* cited by examiner

SYSTEMS AND METHODS AND PERFORMING OFFSET IQ MODULATION

CROSS-REFERENCE TO RELATED APPLICATIONS

The current application claims priority to U.S. Provisional Patent Application No. 62/065,179, filed Oct. 17, 2014, the disclosure of which is incorporated herein by reference.

FEDERAL SUPPORT STATEMENT

The invention described herein was made in the performance of work under a NASA contract, and is subject to the provisions of Public Law 96-517 (35 U.S.C. § 202) in which the Contractor has elected to retain title.

FIELD OF THE INVENTION

The present invention relates generally to modulation techniques and more specifically to modulation and demodulation systems and methods that can be utilized in radar systems and digital communication systems.

BACKGROUND

Radar stands for Radio Detection and Ranging. Radar systems typically transmit a pulsed electromagnetic wave, which is scattered or reflected by objects, particles and/or irregularities in the refractive index of the atmosphere. The radar system can utilize the reflected waves to determine the characteristics of objects, particles, and/or atmospheric phenomena that are responsible for the reflections. A high gain antenna is typically utilized to focus the transmission. Ranging can be performed based upon the time delay between the transmitted and received signals. The range resolution is typically determined based upon the frequency bandwidth of the transmitted electromagnetic pulse. Angular resolution is impacted by the beam width of the transmitted signal.

The sensitivity of a radar system increases as the frequency of the transmitted electromagnetic pulse increases if all other parameters are kept constant. However, atmospheric absorption and attenuation of radar transmission generally increases with increased frequency. Many high resolution radar systems utilized in atmospheric research transmit within the Ka band. The Ka band is typically defined to cover frequencies of 26.5-40 GHz (i.e. wavelengths from slightly over one centimeter down to 7.5 millimeters).

Many radars that operate in the Ka band utilize a digital to analog converter to synthesize an electromagnetic pulse that is modulated to an intermediate frequency, where it is filtered to remove an image signal. The filtered intermediate frequency signal is then modulated to a carrier frequency for transmission. A similar process can be used in reverse during demodulation of reflected transmissions.

SUMMARY OF THE INVENTION

Systems and methods in accordance with various embodiments of the invention involve offset IQ modulation. A radar system in accordance with an embodiment of the invention includes: an antenna; a local oscillator capable of generating a local oscillator signal at a carrier frequency; a modulator; a demodulator; and a switch. The digital modulator includes: a digital to analog converter capable of receiving a digital input signal and generating a frequency offset analog signal and a quadrature version of the frequency offset analog signal, where the frequency offset analog signal and the quadrature version of the frequency offset analog signal do not contain frequency components below an oscillator leakage threshold frequency; a first low pass filter capable of receiving and low pass filtering the frequency offset analog signal and outputting a filtered frequency offset in-phase analog signal; a second low pass filter capable of receiving and low pass filtering the quadrature version of the frequency offset analog signal and outputting a filtered frequency offset quadrature analog signal; an IQ mixer capable of combining the filtered frequency offset in-phase analog signal and the filtered frequency offset quadrature analog signal to produce a modulated output signal using the local oscillator signal. The modulated output signal includes: a transmitted signal; an image signal; and a local oscillator leakage signal. The demodulator also includes a power amplifier capable of amplifying the modulated output signal to generate a transmitted output signal. The power amplifier is nonlinear and the transmitted output signal includes: the transmitted signal; the image signal; the oscillator leakage signal; and nonlinear intermodulation signals. The demodulator includes a bandpass filter capable of band pass filtering a received signal includes reflections of the transmitted output signal to produce a filtered received signal. The filtered received signal includes: a transmitted signal component; an image signal component; an oscillator leakage signal component; and nonlinear intermodulation components. The demodulator also includes: a low noise amplifier capable of amplifying the filtered received signal to generate an amplified reflection signal; a down converting IQ mixer capable of receiving the amplified reflection signal and the local oscillator signal and generating an in-phase baseband analog signal and a quadrature baseband analog signal; a first low pass filter capable of receiving and low pass filtering the in-phase baseband analog signal and outputting a filtered in-phase analog basedband signal; a second low pass filter capable of receiving and low pass filtering the quadrature baseband analog signal and outputting a filtered quadrature baseband analog signal; a first analog to digital converter capable of oversampling the filtered in-phase analog baseband signal to produce a digitized in-phase signal; a second analog to digital converter capable of oversampling the filtered quadrature analog baseband signal and a digitized quadrature signal; and a digital signal processing system capable of linear filtering the digitized in-phase signal and the digitized quadrature signal to obtain the transmitted signal component; and a switch capable of switching the antenna between the modulator and the demodulator.

In a further embodiment, the IQ mixer is capable of: receiving as inputs the local oscillator signal, the filtered frequency offset in-phase analog signal, and the filtered frequency offset quadrature analog signal; mixing the filtered frequency offset in-phase analog signal and the local oscillator signal to produce a mixed in-phase analog signal using a first mixer; converting the local oscillator signal to a quadrature local oscillator signal using a quadrature hybrid connector; mixing the filtered frequency offset quadrature analog signal and the quadrature local oscillator signal to produce a mixed quadrature analog signal using a second mixer; and combining the mixed in-phase analog signal and the mixed quadrature analog signal to produce the modulated output signal.

In another embodiment, the transmitted signal is formed by the combination of the mixed in-phase analog signal and the mixed quadrature analog signal at a first frequency offset relative to the carrier frequency; and the image signal is formed by the combination of the mixed in-phase analog signal and the mixed quadrature analog signal at a second frequency offset relative to the carrier frequency.

In a further embodiment, the nonlinear intermodulation components include third-order intermodulations of components selected from the group consisting of the transmitted signal component, the image signal component, and the oscillator leakage signal component.

In still another embodiment, the nonlinear intermodulation components include a third-order intermodulation of the oscillator leakage signal component with the image signal component.

In a still further embodiment, the nonlinear intermodulation components include a third-order intermodulation of the transmitted signal component with the image signal component.

In yet another embodiment, the frequency offset analog signal is a band limited signal having a bandwidth that is sufficiently narrow so that the frequency spectra of the transmitted signal component and the third-order intermodulation of the transmitted signal component with the image signal component do not overlap.

In a yet further embodiment, the nonlinear intermodulation components include a third-order intermodulation of the transmitted signal component with the local oscillator leakage component.

In another embodiment again, the frequency offset analog signal is a band limited signal having a bandwidth that is sufficiently narrow so that the frequency spectra of the transmitted signal component and the third-order intermodulation of the transmitted signal component with the local oscillator leakage component do not overlap.

In a further embodiment again, the down converting IQ mixer is capable of: receiving as inputs the local oscillator signal, and the amplified reflection signal; mixing the amplified reflection signal and the local oscillator signal to produce the in-phase analog baseband signal using a first down mixer; converting the local oscillator signal to a quadrature local oscillator signal using a quadrature hybrid connector; and mixing the amplified reflection signal and the quadrature local oscillator signal to produce a quadrature analog baseband signal using a second down mixer.

In another additional embodiment, the digital signal processing system is capable of determining range by autocorrelating the transmitted signal component with the digital input signal used to generate the frequency offset analog signal.

In a further additional embodiment, the frequency offset analog signal is a pulse compressed waveform.

In still yet another embodiment, the frequency offset analog signal is a frequency offset tapered chirp.

In a still yet further embodiment, the oscillator is a digital resonator.

In still another embodiment again, the local oscillator generates a local oscillator signal having a carrier frequency in the Ka band.

In a still yet further embodiment again, the digital signal processing system capable of linear filtering the digitized in-phase signal and the digitized quadrature signal to obtain the transmitted signal component uses a Parks-McClellan digital filter.

In still another additional embodiment, the digital processing system is a field programmable gate array (FPGA).

In a still further additional embodiment, the quadrature analog output signal is a quarter wavelength out of phase with the in-phase analog signal.

An offset IQ modulator in accordance with an embodiment of the invention includes: a digital to analog converter capable of receiving a digital input signal and generating a frequency offset analog signal and a quadrature version of the frequency offset analog signal, where the frequency offset analog signal and the quadrature version of the frequency offset analog signal do not contain frequency components below an oscillator leakage threshold frequency; a first low pass filter capable of receiving and low pass filtering the frequency offset analog signal and outputting a filtered frequency offset in-phase analog signal; a second low pass filter capable of receiving and low pass filtering the quadrature version of the frequency offset analog signal and outputting a filtered frequency offset quadrature analog signal; an IQ mixer capable of combining the filtered frequency offset in-phase analog signal and the filtered frequency offset quadrature analog signal to produce a modulated output signal using the local oscillator signal; and a power amplifier capable of amplifying the modulated output signal to generate a transmitted output signal. In addition, the modulated output signal includes: a transmitted signal; an image signal; and a local oscillator leakage signal. Furthermore, the power amplifier is nonlinear and the transmitted output signal includes: the transmitted signal; the image signal; the oscillator leakage signal; and nonlinear intermodulation signals.

An offset IQ demodulator in accordance with an embodiment of the invention includes: a bandpass filter capable of band pass filtering a received signal including reflections of the transmitted output signal to produce a filtered received signal; a low noise amplifier capable of amplifying the filtered received signal to generate an amplified reflection signal; a down converting IQ mixer capable of receiving the amplified reflection signal and the local oscillator signal and generating an in-phase baseband analog signal and a quadrature baseband analog signal; a first low pass filter capable of receiving and low pass filtering the in-phase baseband analog signal and outputting a filtered in-phase analog basedband signal; a second low pass filter capable of receiving and low pass filtering the quadrature baseband analog signal and outputting a filtered quadrature baseband analog signal; a first analog to digital converter capable of oversampling the filtered in-phase analog baseband signal to produce a digitized in-phase signal; a second analog to digital converter capable of oversampling the filtered quadrature analog baseband signal and a digitized quadrature signal; and a digital signal processing system capable of linear filtering the digitized in-phase signal and the digitized quadrature signal to obtain the transmitted signal component. In addition, the received signal includes: a transmitted signal component; an image signal component; an oscillator leakage signal component; and nonlinear intermodulation components;

DETAILED DESCRIPTION

Figure 1:
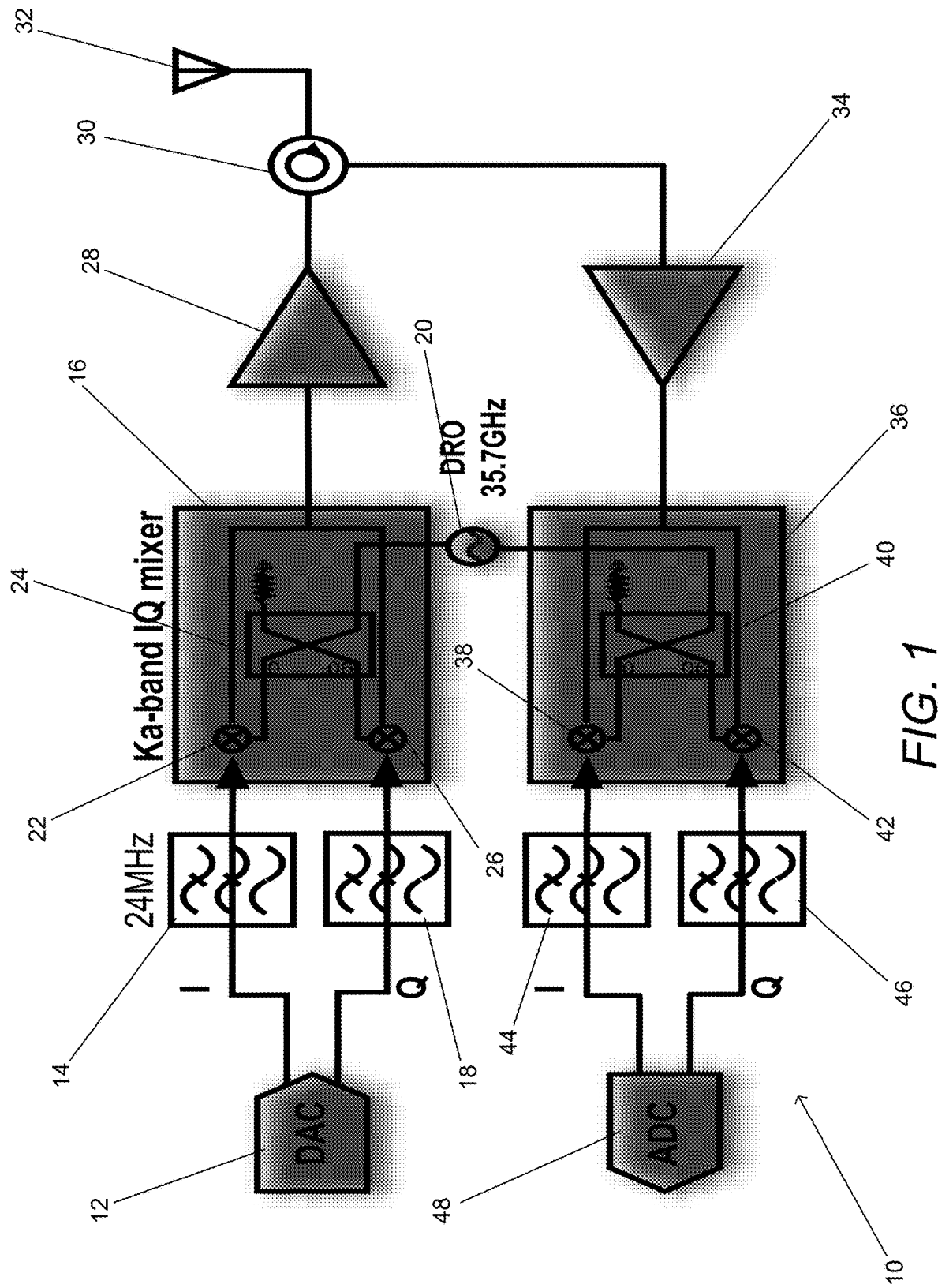
FIG. 1 conceptually illustrates an offset IQ modulation system in accordance with an embodiment of the invention.

Systems and methods in accordance with embodiments of the invention transmit and detect electromagnetic signals using an offset IQ modulation technique. IQ modulation is a modulation technique that typically involves the use of IQ mixers to up convert and down convert intermediate frequency signals to a carrier frequency. An IQ mixer is actually two mixers with a quadrature hybrid coupler that divides the local oscillator into an in-phase local oscillator signal that is provided to a first mixer and a quadrature local oscillator signal that is provided to the second mixer. To assure high signal quality, the ideal IQ modulator would have perfectly symmetrical in-phase and quadrature arms. While developers strive for a symmetrical IQ modulator circuit, manufacturing process variations cause slight differences between the in-phase and quadrature paths on the same die. These imbalances typically cause the carrier tone and an image signal to bleed into the output signal.

Offset IQ modulation systems in accordance with many embodiments of the invention use a digital to analog converter to generate a transmitted waveform that is frequency offset from direct current (DC) by an amount equal or larger than half the signal bandwidth, so that the level of any local oscillator leakage present within the frequency band containing the transmitted signal is insignificant. As noted above, the transmitted signal likely contains an image signal in addition to the local oscillator leakage. The level of image signal present within the frequency band containing the transmitted signal is also insignificant. When the transmitted signal is received, an IQ mixer is also used to down convert the received signal. In many embodiments, the down converted signal is over sampled and provided to a digital signal processing system to perform linear filtering to remove intermodulation and/or crossmodulation components within the signal that can be introduced by nonlinearities in components such as (but not limited to) Power Amplifiers (PA), Low Noise Amplifiers (LNA) and/or the IQ mixer used during the down conversion.

The use of offset IQ modulation to directly modulate a baseband signal generated by a digital to analog converter to a carrier frequency can result in significant power savings relative to systems that modulate a baseband signal to an intermediate frequency prior to modulation of the intermediate frequency signal to the carrier frequency. In addition, the use of a frequency offset in the baseband signal in combination with linear filtering can result in significant sidelobe attenuation. When IQ modulation systems in accordance with various embodiments of the invention are utilized in radar systems, the sidelobe attenuation directly translates to improved clutter rejection. In several embodiments, IQ modulation systems are incorporated in small form factor satellites such as (but not limited to) so called "cube satellites". The reduced component count and power consumption can enable IQ modulation systems to occupy less space and consume less power relative to conventional modulation systems.

Offset IQ modulation systems and processes for performing offset IQ modulation in accordance with various embodiments of the invention are discussed further below.

Offset IQ Modulation Systems

An IQ modulation system in accordance with an embodiment of the invention is illustrated in FIG. 1. The IQ modulation system 10 includes a digital to analog converter 12 that generates an analog waveform. As is discussed above, the generated analog waveform includes a frequency offset so that any oscillator leakage that occurs during the modulation of the baseband signal is at insignificant levels within the portion of the frequency spectrum occupied by the modulated analog waveform. Based upon the characteristics of the system, an oscillator leakage threshold frequency can be defined and the frequency offset of the analog waveform determined so that the analog waveform is band limited to a frequency band above the oscillator leakage threshold frequency.

Figures 2A, 2B:
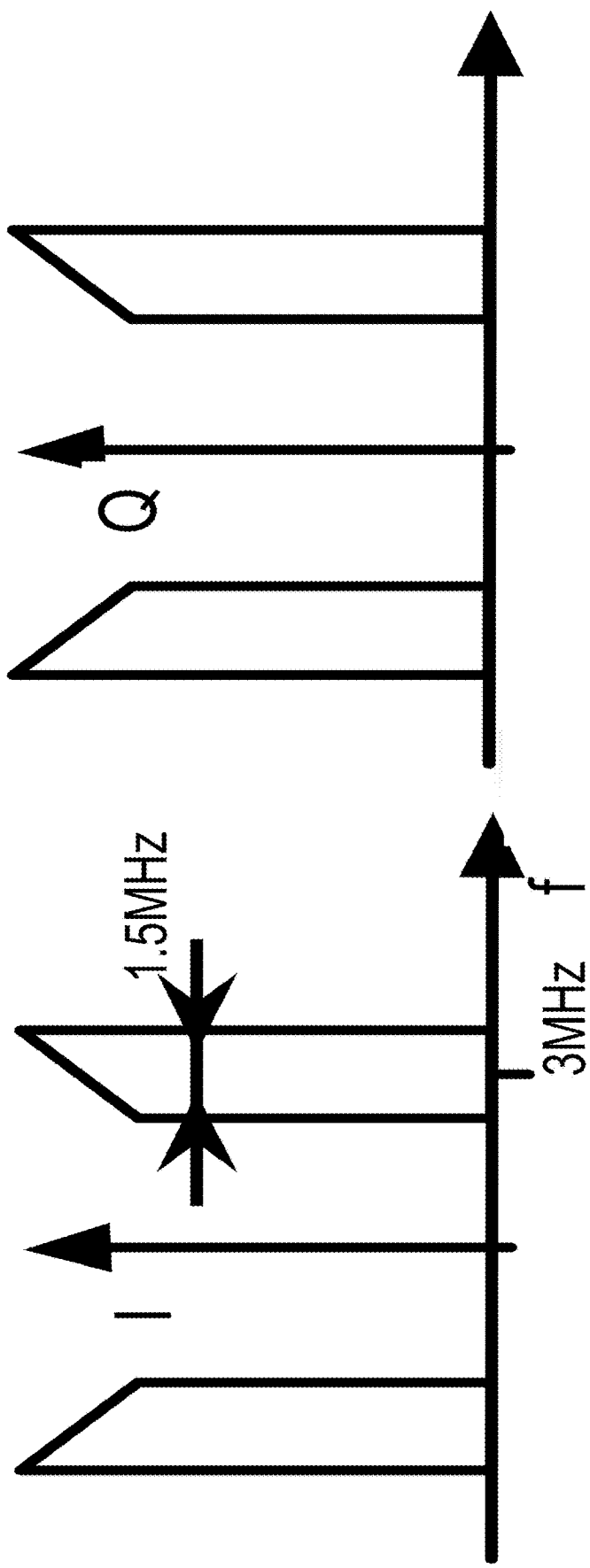
FIGS. 2A-2D conceptually illustrate frequency spectra of various signals present within an offset IQ modulation system in accordance with an embodiment of the invention.

An in-phase version of the analog waveform is provided to an in-phase signal path, which includes a low pass filter 14 that provides a filtered in-phase analog output as an input to an IQ mixer 16. A quadrature version of the analog waveform output by the digital to analog converter 12 is provided to a quadrature signal path that includes a second low pass filter 18 that provides a filtered quadrature analog output as a second input to the IQ mixer 16. The frequency components of the in-phase and quadrature versions of the analog waveform are illustrated in FIGS. 2A and 2B. The frequency spectrum of each signal includes a narrow band of frequency components centered around a frequency offset from DC, which is similar to the frequency spectra of analog waveforms utilized by radar systems that employ pulse compression. The use of pulse compression in radar systems in accordance with various embodiments of the invention is discussed further below.

Referring again to FIG. 1, the IQ mixer 16 receives a local oscillator signal from a local oscillator 20. In the illustrated embodiment, the local oscillator 20 is a free running dielectric resonator oscillator (DRO). As can readily be appreciated, any of a variety of local oscillators can be utilized as appropriate to the requirements of a specific application. The IQ mixer mixes the local oscillator signal with the filtered in-phase analog signal using a first mixer 22. The IQ mixer also uses a quadrature hybrid coupler 24 to convert the local oscillator signal to a quadrature local oscillator signal that is mixed with the filtered quadrature analog signal using a second mixer 24. The outputs of the first and second mixers 22, 24 are then combined and provided as an input to a power amplifier 28, which can be connected by a switch 30 to a high gain antenna 32 to transmit a transmitted output signal. In the illustrated embodiment, the local oscillator generates a local oscillator signal at a carrier frequency of 35.7 GHz (i.e. within the Ka band). As can readily be appreciated, the carrier frequency can be selected as appropriate to the requirements of specific applications.

Figure 2C:
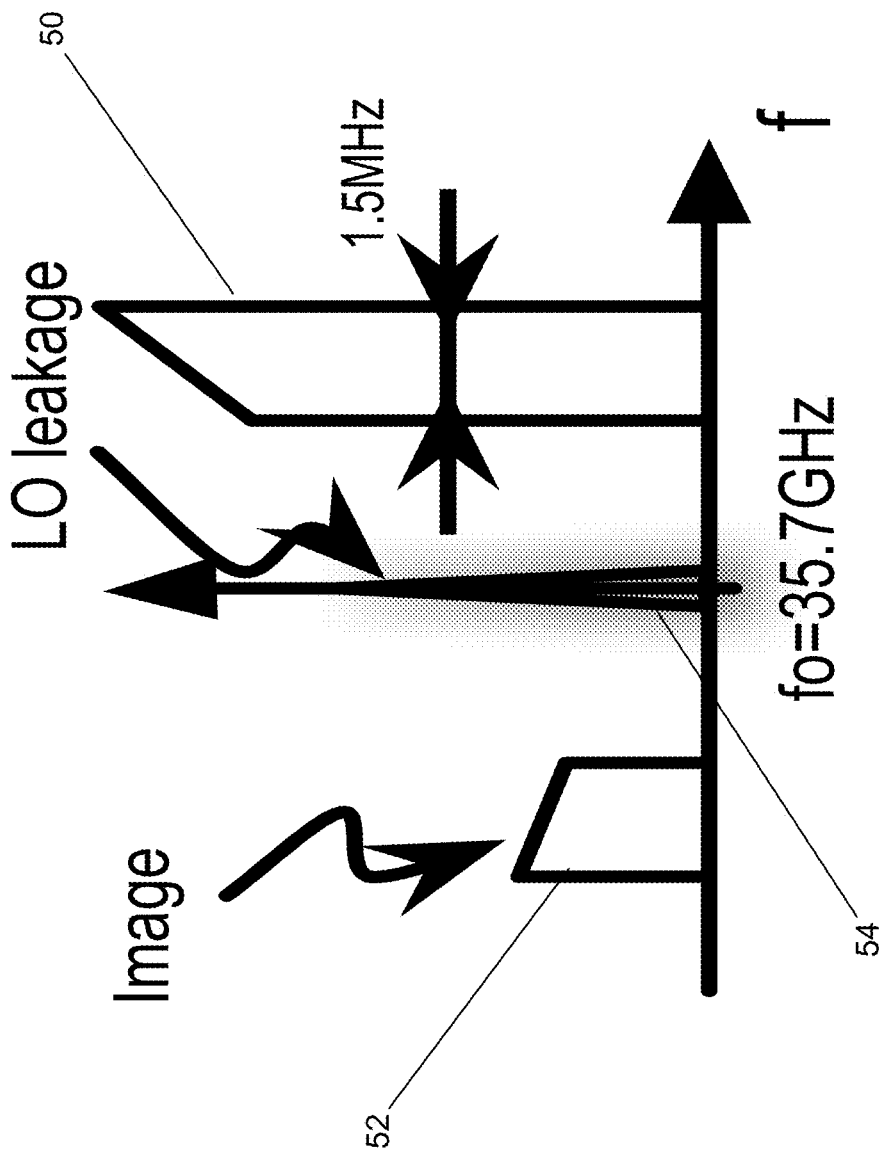

As noted above, the differences between the in-phase and quadrature paths prevent the IQ mixer from completely suppressing the image signals in the input analog waveforms and the resulting modulated output signal typically includes the transmitted signal, an image signal, and a local oscillator leakage signal. The frequency spectrum of a modulated output signal generated by an offset IQ modulation system from the in-phase and quadrature signals conceptually illustrated in FIGS. 2A and 2B is shown in FIG. 2C. The modulated output signal is made of signals including (but not limited to) a transmitted signal 50, an image signal 52, and a local oscillator leakage signal 54 that occupy distinct frequency bands. As can readily be appreciated, the frequency offset of the in-phase and quadrature versions of the analog waveform generated by the digital to analog converter results in the transmitted signal occupying portions of the frequency spectrum in which the oscillator leakage signal and the image signal are insignificant. As is discussed further below, the fact that the frequency spectra of the transmitted signal and the local oscillator leakage do not overlap to any significant extent enables the use of linear filters to remove intermodulation and/or crossmodulation components introduced by nonlinearities in the power amplifier in the transmit path and/or components within the receive path of the IQ modulation system.

The receive path of the IQ modulation system is also illustrated in FIG. 1. In the illustrated embodiment, the high gain antenna 32 can also be used to receive reflections of the transmitted signal. The switch 30 can connect the high gain antenna 32 to a receive path in which a reflected signal received by the high gain antenna is provided to a Low Noise Amplifier 34. The Low Noise Amplifier 34 significantly increases the amplitude of the weak reflected signal and provides the amplified reflection signal to an IQ mixer 36 for down conversion. However, nonlinearities present within the power amplifier 28 and Low Noise Amplifier 34 can introduce intermodulation (often referred to as intermodulation distortion) and/or crossmodulation. The term intermodulation refers to distortions that manifest within a signal when nonlinearities cause the different frequency components of a signal to mix with each other. Intermodulation can result in additional signals at frequencies that are not just at harmonic frequencies of either signal, but also at the sum and difference frequencies of the original frequency components and at multiples of those original frequency components (e.g. third-order intermodulation distortion can mix frequencies $f_1$ and $f_2$ to produce intermodulation signals at $2f_1-f_2$ and $2f_1+f_2$).

Figure 2D:
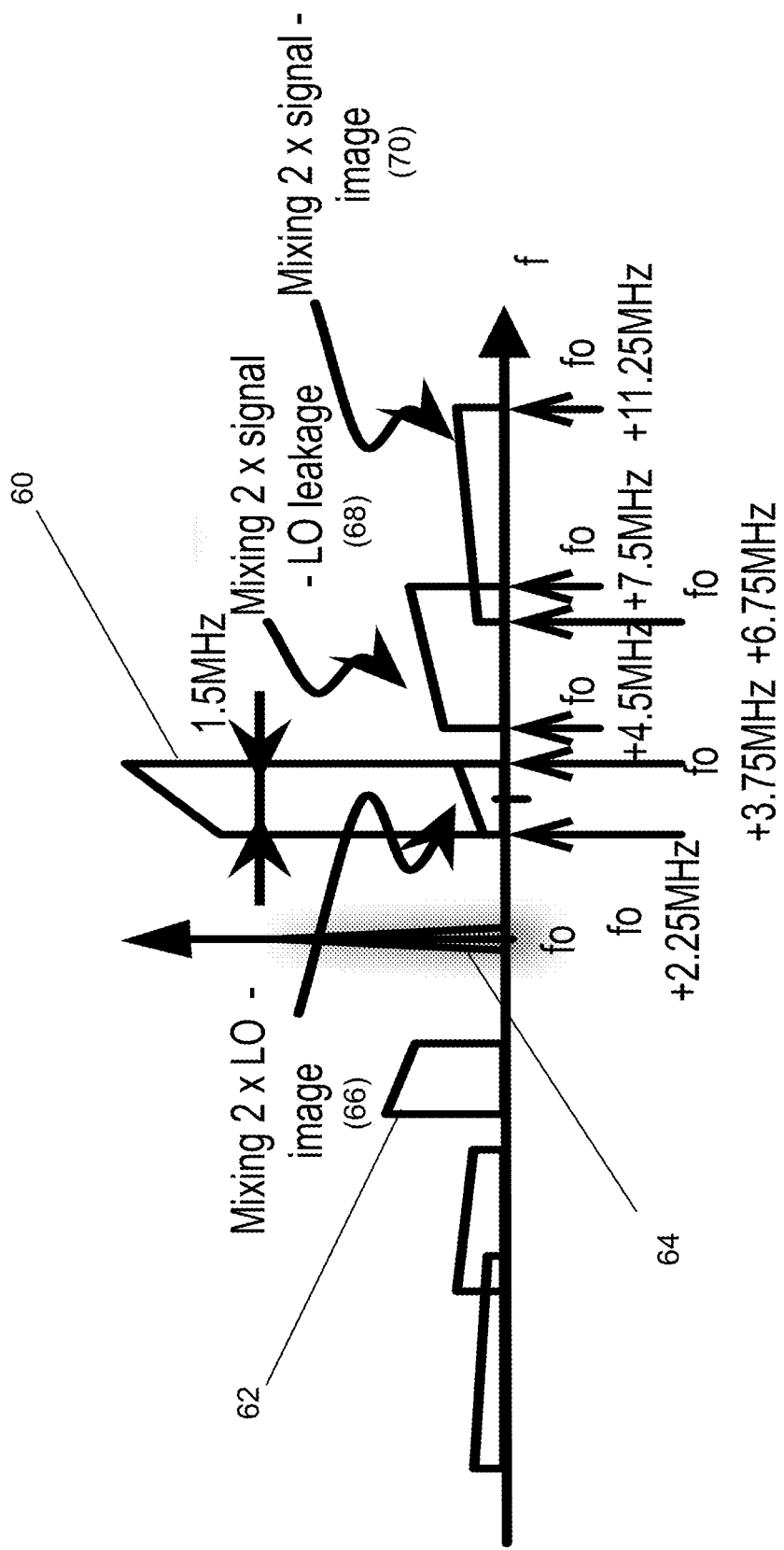

The effect of intermodulation within the frequency band surrounding the carrier frequency of a received reflection of the transmitted output signal illustrated in FIG. 2C is shown in FIG. 2D. The signal output by the Low Noise Amplifier includes a transmitted signal component 60, an image component 62, and a local oscillator leakage component 64. In addition, intermodulation can introduce additional signal components within a frequency band surrounding the carrier frequency including (but not limited to) a first nonlinear component (66) resulting from the third-order intermodulation of the local oscillator component with the image component, a second nonlinear component (68) resulting from the third-order intermodulation of the transmitted signal component with the local oscillator leakage component, and a third nonlinear component (70) resulting from the third-order intermodulation of the transmitted signal component and the image component. Due to the relationship between the bandwidth of the transmitted signal component and the frequency offset of the transmitted signal component, the second and third nonlinear components occupy frequency bands that are non-overlapping with the frequency band of the transmitted signal component. The first nonlinear signal component does, however, occupy an identical frequency band to the transmitted signal component. However, its impact tends to be small because it is the product of three small signals, as opposed to, for example, the second nonlinear signal component 68, which mixes the transmitted signal component with the local oscillator leakage component. Where the transmitted signal is a chirp, the first nonlinear signal component 66 has the same chirp slope as the transmitted signal component, so it typically does not contribute significantly to sidelobes. Although specific nonlinear components that are introduced by third-order intermodulation are described above with reference to FIG. 2D, systems and methods in accordance with various embodiments of the invention can accommodate any of a variety of intermodulation and/or crossmodulation components introduced by nonlinearities within power amplifiers, Low Noise Amplifiers and/or IQ mixers.

Referring again to FIG. 1, the output of the Low Noise Amplifier 34 provides the amplified reflection signal to an IQ mixer 36 for down conversion. The IQ mixer 36 includes an in-phase downconverted output signal path and a quadrature downconverted output signal path. The in-phase downconverted output signal is obtained by mixing the amplified reflection signal with a local oscillator signal obtained from the local oscillator 20 using a first down mixer 38. The IQ mixer also uses a quadrature hybrid coupler 40 to convert the local oscillator signal to a quadrature local oscillator signal that is mixed with the amplified reflection signal using a second down mixer 42. The in-phase downconverted output signal and quadrature downconverted output signals are low pass filtered 44, 46 and provided to an analog to digital converter system 48 for digitization using oversampling.

The term oversampling refers to a sampling that involves sampling at a rate that is higher than twice the highest frequency component of the received band limited signal (i.e. at a rate higher than the Nyquist rate). As noted above, the baseband signal provided to the analog to digital converter system includes a number of nonlinear intermodulation components. The digitized in-phase and quadrature signals can be provided to a linear filter that can be utilized to filter out the local oscillator leakage, the image signal and the intermodulation products that do not overlap the desired frequency band. In several embodiments, a Parks-McClellan digital linear filter can be utilized. In other embodiments, any of a variety of linear filters can be utilized as appropriate to the requirements of specific applications.

Although specific offset IQ modulation systems are described above with reference to FIGS. 1 and 2A-2D, any of a variety of modulation and/or demodulation circuits can be utilized to perform offset IQ modulation in accordance with various embodiments of the invention. Utilization of offset IQ modulation systems in various applications are discussed further below.

Applications of Offset IQ Modulation

Offset IQ modulation systems can provide significant advantages in radar systems including (but not limited) small low power radar systems that will be flown on small satellites such as, so called, cube satellites. A cube satellite including a radar utilizing an offset IQ modulation system in accordance with an embodiment of the invention is illustrated in FIG. 3.

Figure 3:
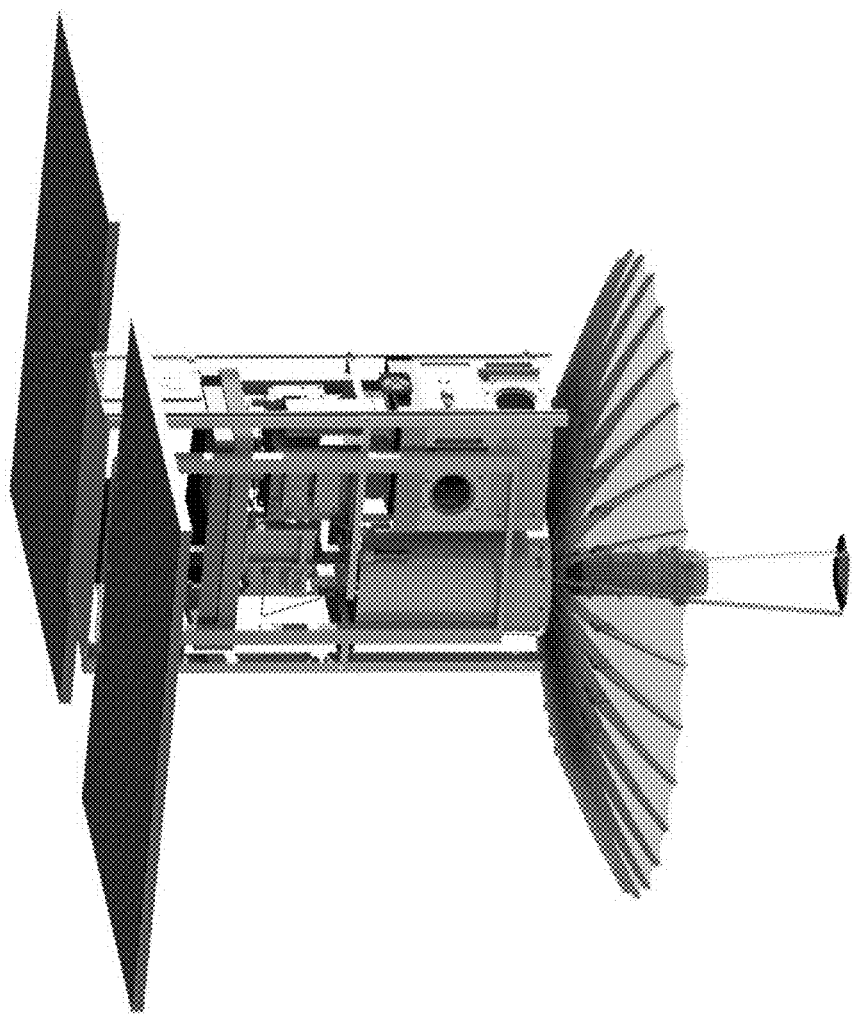
FIG. 3 conceptually illustrates a cube satellite including a radar system implemented using an offset IQ modulation system in accordance with an embodiment of the invention.
Figure 4:
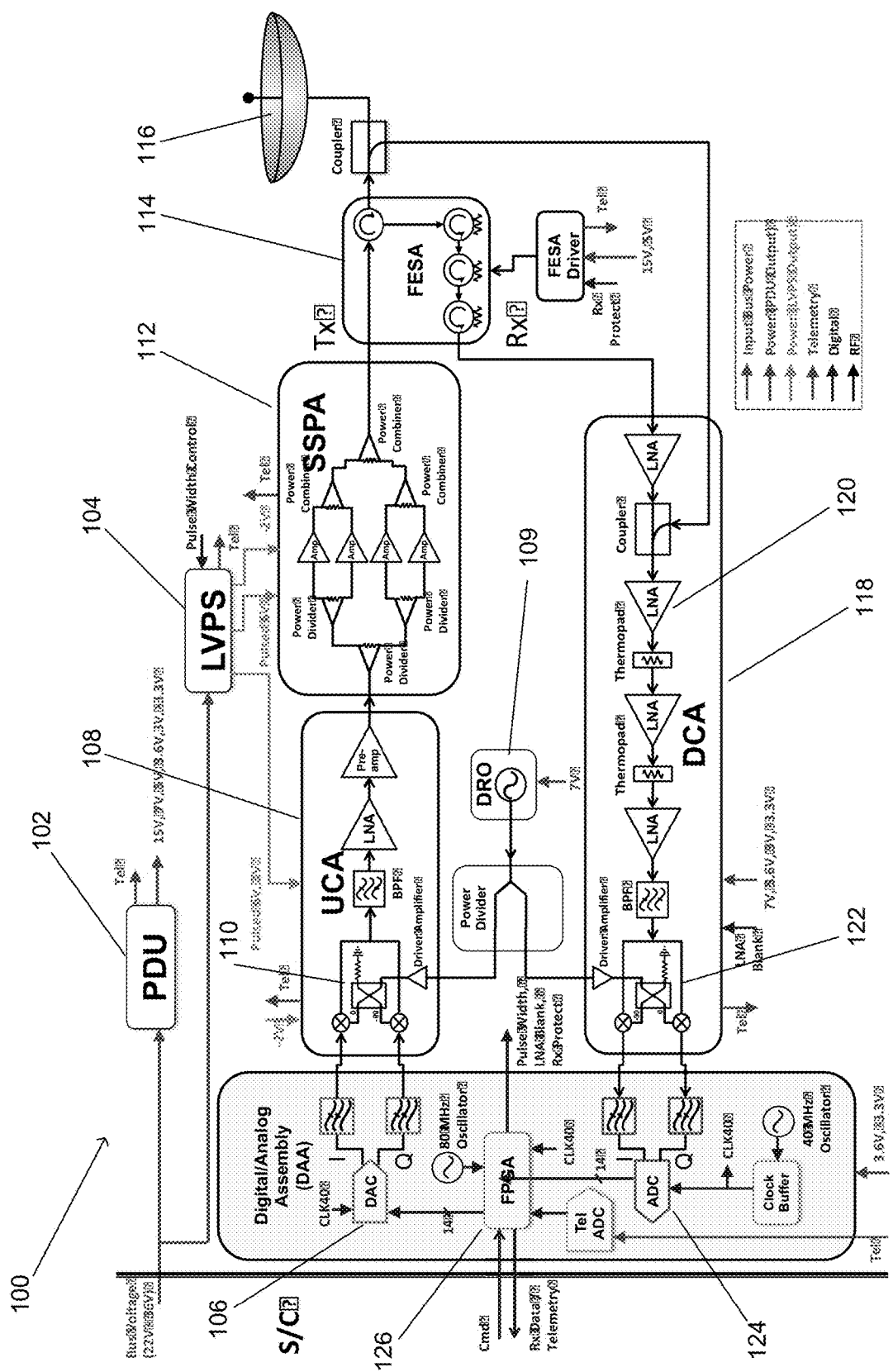
FIG. 4 conceptually illustrates an offset IQ modulation system utilized within a radar system in accordance with an embodiment of the invention.

An offset IQ modulation system that can be utilized within the form factor available within a small satellite, such as the cube satellite illustrated in FIG. 3, is shown in FIG. 4. The offset IQ modulation system 100 provides power to a variety of components using a power distribution unit 102 and a low voltage power supply 104. An FPGA 126 provides frequency offset waveforms 106 to a digital to analog converter 106. The digital to analog converter provides in-phase and quadrature versions of the analog waveform to the modulation path of the offset IQ modulation system. In many embodiments, the radar employs pulse compression and the digital to analog converter generates an analog waveform such as (but not limited to) a tapered chirp. Pulse compression is a signal processing technique that can be utilized in radar systems, which attempts to achieve a sensitivity comparable to that obtained by long pulses in combination with the fine range resolution characteristic of short pulses. The technique can be particularly beneficial when deployed with radars having relatively low peak power and consequently relatively lower sensitivity.

Pulse compression typically involves modulating a transmitted pulse and correlating the received signal with the transmitted pulse. Increasing the length of the pulse increases the sensitivity of the radar, but typically decreases the ranging resolution of the radar. With pulse compression, the transmitted pulse has a shape that is designed so that the pulse width of the intercorrelated signals is shorter than the pulse width of the transmitted signal. A chirp is commonly used in radar systems that employ pulse compression. A chirp involves varying the frequency of the transmitted signal across a frequency range (Δf) throughout the duration of the transmission. When the transmitted signal is autocorrelated, the temporal width is approximately equal to the inverse of the frequency range (i.e. 1/Δf) and so the frequency range can be selected to ensure that the temporal width is shorter than the transmitted pulse width. In this way, pulse compression can increase ranging resolution without decreasing sensitivity.

Referring again to FIG. 4, the modulation path of the offset IQ modulation system includes an up conversion amplifier 108 that receives a local oscillator signal from a local oscillator 109 and incorporates an IQ mixer 110. The output of the up conversion amplifier is provided to a solid state power amplifier 112, which can be switchably connected (114) to a high gain antenna 116.

Reflections detected by the high gain antenna 116 can be switched (114) into a demodulation signal path. The demodulation signal path includes a down conversion amplifier 110 that includes a cascade of Low Noise Amplifiers 120. As noted above, the solid state power amplifier 112, and/or Low Noise Amplifiers 120 can introduce intermodulation and/or crossmodulation into the received signal. The down conversion amplifier 110 also includes an IQ mixer 122 that utilizes the local oscillator signal from the local oscillator 109 to down mix the reflected signal to baseband. The down mixing results in an in-phase signal and a quadrature signal that are filtered and digitized by analog to digital converters 124. The digitized signals are provided to the FPGA 126, which applies linear filtering to remove intermodulation components from the reflections of the frequency offset transmitted signal. Although the system illustrated in FIG. 4 utilizes an FPGA, any of a variety of digital signal processing circuits can be utilized to perform linear filtering including (but not limited to) a digital signal processor, a microprocessor, and/or an application specific integrated circuit as appropriate to the requirements of specific applications in accordance with many embodiments of the invention.

Figure 5B:
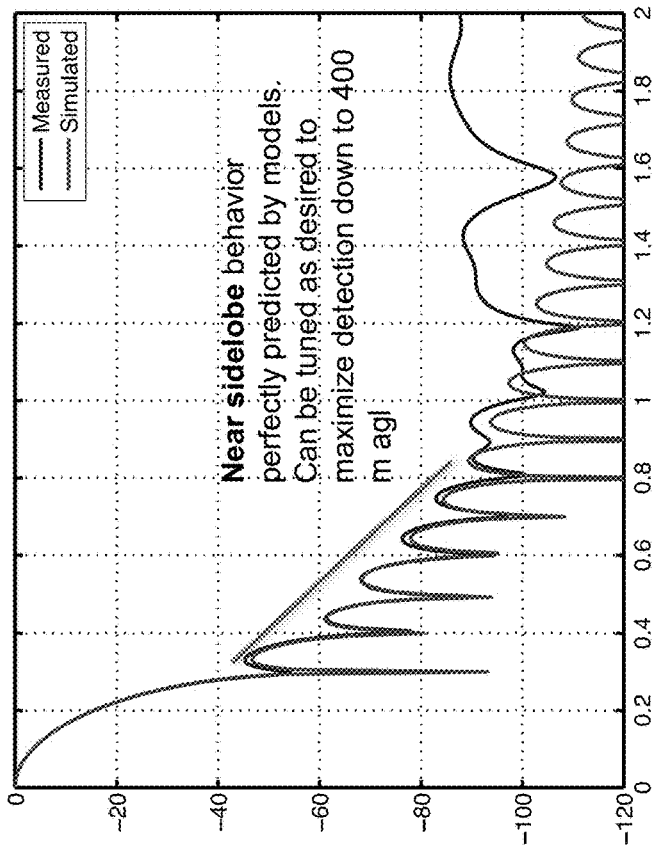
FIGS. 5A and 5B illustrate the performance of the radar system illustrated in FIG. 4.
Figure 5A:
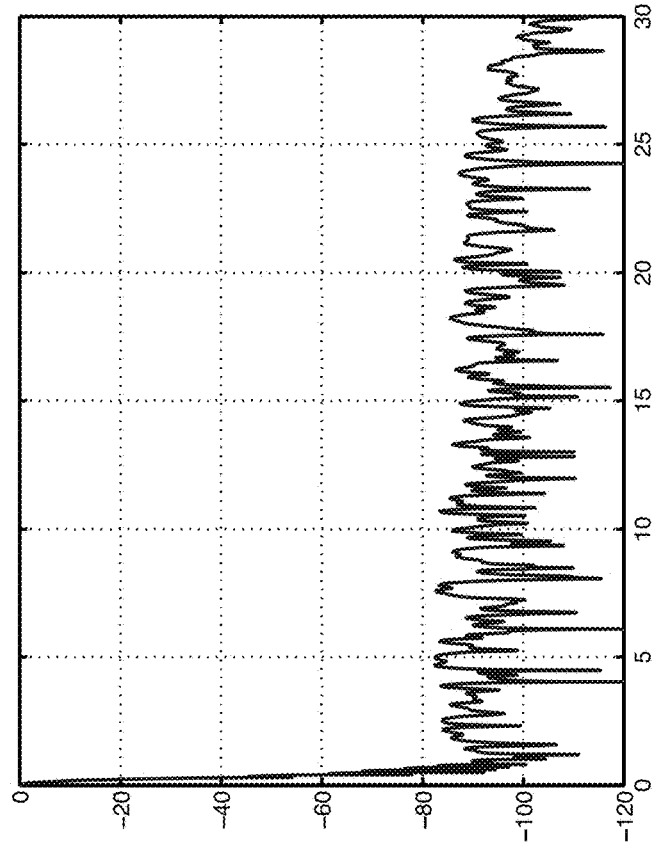

The performance of a radar implemented using the offset IQ modulation system illustrated in FIG. 4 is shown in FIGS. 5A and 5B. FIG. 5A illustrates the point target response in dB against range in kilometers for a 1.5 MHz tapered chirp in an offset IQ modulation system that mixes the frequency offset tapered chirp into the Ka band. FIG. 5B compares simulated results with measured results for the point target response in dB for ranges of between 0 and 2 km and the simulated results agree well with the measurement showing excellent side lobe suppression (>80 dB). While specific range resolutions are shown in FIGS. 5A and 5B, the performance attained by a radar utilizing an offset IQ modulation system in accordance with various embodiments of the system is largely dictated by the requirements of a given application.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A Ka band radar system, comprising:
an antenna;
a local oscillator configured to generate a local oscillator signal at a carrier frequency;
a modulator comprising:
  a digital to analog converter configured to receive a digital input signal, the digital input signal having a bandwidth, and generate a modulated frequency offset analog signal and a quadrature version of the frequency offset analog signal, where the frequency offset analog signal and the quadrature version of the frequency offset analog signal do not contain frequency components below an oscillator leakage threshold frequency, and where the frequency offset analog signal is frequency offset from direct current (DC) by an amount of at least half of the digital input signal bandwidth;
  a first low pass filter configured to receive and low pass filtering the frequency offset analog signal and outputting a filtered frequency offset in-phase analog signal;
  a second low pass filter configured to receive and low pass filtering the quadrature version of the frequency offset analog signal and outputting a filtered frequency offset quadrature analog signal;
  an IQ mixer configured to directly modulate the filtered frequency offset in-phase analog signal and the filtered frequency offset quadrature analog signal to the carrier frequency to produce a modulated output signal using the local oscillator signal, where the modulated output signal comprises:
    a transmitted signal;
    an image signal; and
    a local oscillator leakage signal;
  a power amplifier configured to amplify the modulated output signal to generate a transmitted output signal, where the power amplifier is nonlinear and the transmitted output signal comprises:
    the transmitted signal;
    the image signal;
    the oscillator leakage signal; and
    nonlinear intermodulation signals;
  wherein the modulated output signal is transmitted via the antenna;
a demodulator configured to receive a signal via the antenna, the signal comprising:
  a component representing the digital input signal;
  an image signal component;
  an oscillator leakage signal component; and
  nonlinear intermodulation components;
the demodulator comprising:
  a low noise amplifier configured to amplify the received signal to generate an amplified reflection signal;
  a down converting IQ mixer configured to receive the amplified reflection signal and the local oscillator signal and generate, at the carrier frequency, an in-phase baseband analog signal and a quadrature baseband analog signal;
  a third low pass filter configured to receive and low pass filtering the in-phase baseband analog signal and outputting a filtered in-phase analog baseband signal;

a fourth low pass filter configured to receive and low pass filtering the quadrature baseband analog signal and outputting a filtered quadrature baseband analog signal;

a first analog to digital converter configured to oversample the filtered in-phase analog baseband signal to produce a digitized in-phase signal;

a second analog to digital converter configured to oversample the filtered quadrature analog baseband signal to produce a digitized quadrature signal; and a digital signal processing system configured to apply a linear filter to the digitized in-phase signal and the digitized quadrature signal to obtain the component representing the digital input signal; and a switch configured to switch the antenna between the modulator and the demodulator.

2. The radar system of claim 1, wherein the IQ mixer is configured to:

receive as inputs the local oscillator signal, the filtered frequency offset in-phase analog signal, and the filtered frequency offset quadrature analog signal;

mix the filtered frequency offset in-phase analog signal and the local oscillator signal to produce a mixed in-phase analog signal using a first mixer;

convert the local oscillator signal to a quadrature local oscillator signal using a quadrature hybrid connector;

mix the filtered frequency offset quadrature analog signal and the quadrature local oscillator signal to produce a mixed quadrature analog signal using a second mixer; and combine the mixed in-phase analog signal and the mixed quadrature analog signal to produce the modulated output signal.

3. The radar system of claim 2, wherein:

the transmitted signal is formed by the combination of the mixed in-phase analog signal and the mixed quadrature analog signal at a first frequency offset relative to the carrier frequency; and the image signal is formed by the combination of the mixed in-phase analog signal and the mixed quadrature analog signal at a second frequency offset relative to the carrier frequency.

4. The radar system of claim 1, wherein the nonlinear intermodulation components comprise third-order intermodulations of components selected from the group consisting of the transmitted signal component, the image signal component, and the oscillator leakage signal component.

5. The radar system of claim 1, wherein the nonlinear intermodulation components comprise a third-order intermodulation of the oscillator leakage signal component with the image signal component.

6. The radar system of claim 1, wherein the nonlinear intermodulation components comprise a third-order intermodulation of the transmitted signal component with the image signal component.

7. The radar system of claim 6, wherein the frequency offset analog signal is a band limited signal having a bandwidth that is sufficiently narrow so that the frequency spectra of the transmitted signal component and the third-order intermodulation of the transmitted signal component with the image signal component do not overlap.

8. The radar system of claim 1, wherein the nonlinear intermodulation components comprise a third-order intermodulation of the transmitted signal component with the local oscillator leakage component.

9. The radar system of claim 8, wherein the frequency offset analog signal is a band limited signal having a bandwidth that is sufficiently narrow so that the frequency spectra of the transmitted signal component and the third-order intermodulation of the transmitted signal component with the local oscillator leakage component do not overlap.

10. The radar system of claim 1, wherein the down converting IQ mixer is configured to:

receive as inputs the local oscillator signal, and the amplified reflection signal;

mix the amplified reflection signal and the local oscillator signal to produce the in-phase analog baseband signal using a first down mixer;

convert the local oscillator signal to a quadrature local oscillator signal using a quadrature hybrid connector; and mix the amplified reflection signal and the quadrature local oscillator signal to produce a quadrature analog baseband signal using a second down mixer.

11. The radar system of claim 1, wherein the digital signal processing system is configured to determine range by comparing the component representing the digital input signal with the digital input signal used to generate the frequency offset analog signal.

12. The radar system of claim 9, wherein the frequency offset analog signal is a pulse compressed waveform.

13. The radar system of claim 10, wherein the frequency offset analog signal is a frequency offset tapered chirp.

14. The radar system of claim 1, wherein the oscillator is a digital resonator.

15. The radar system of claim 1, wherein the digital signal processing system configured to apply a linear filter to the digitized in-phase signal and the digitized quadrature signal to obtain the transmitted signal component uses a Parks-McClellan digital filter.

16. The radar system of claim 1, wherein the digital processing system is a field programmable gate array (FPGA).

17. The radar system of claim 1, wherein the quadrature analog output signal is a quarter wavelength out of phase with the in-phase analog signal.

18. An offset IQ modulator for a Ka band radar system comprising:

a digital to analog converter configured to receive a digital input signal, the digital input signal having a bandwidth, and generating a modulated frequency offset analog signal and a quadrature version of the frequency offset analog signal, where the frequency offset analog signal and the quadrature version of the frequency offset analog signal do not contain frequency components below an oscillator leakage threshold frequency, and where the frequency offset analog signal is frequency offset from direct current (DC) by an amount of at least half of the digital input signal bandwidth;

a first low pass filter configured to receive and low pass filtering the frequency offset analog signal and outputting a filtered frequency offset in-phase analog signal;

a second low pass filter configured to receive and low pass filtering the quadrature version of the frequency offset analog signal and outputting a filtered frequency offset quadrature analog signal;

an IQ mixer configured to directly modulate the filtered frequency offset in-phase analog signal and the filtered frequency offset quadrature analog signal to the carrier frequency to produce a modulated output signal using the local oscillator signal, where the modulated output signal comprises:

a transmitted signal;

an image signal; and a local oscillator leakage signal; and
a power amplifier configured to amplify the modulated output signal to generate a transmitted output signal, where the power amplifier is nonlinear and the transmitted output signal comprises:
the transmitted signal;
the image signal;
the oscillator leakage signal; and
nonlinear intermodulation signals.

* * * * *